US009612176B2

(12) United States Patent
Hanson et al.

(10) Patent No.: US 9,612,176 B2
(45) Date of Patent: Apr. 4, 2017

(54) TEST HEAD ASSEMBLY FOR USE IN TESTING PROTECTIVE MASKS

(71) Applicant: HAMILTON ASSOCIATES, INC., Owings Mills, MD (US)

(72) Inventors: Eric Allen Hanson, Ruxton, MD (US); Gary Warren McCurdy, Eldersburg, MD (US); Michael Joseph Serach, Glen Rock, PA (US); Christopher Roi Wilson, Fairless Hills, PA (US); David Fisher, Penndel, PA (US); Ron Riemer, Hunt Valley, MD (US)

(73) Assignee: HAMILTON ASSOCIATES, INC., Owings Mills, MD (US)

( * ) Notice: Subject to any disclaimer, the term of this patent is extended or adjusted under 35 U.S.C. 154(b) by 488 days.

(21) Appl. No.: 14/222,599

(22) Filed: Mar. 22, 2014

(65) Prior Publication Data

US 2015/0268124 A1    Sep. 24, 2015

(51) Int. Cl.
*G01M 3/20* (2006.01)
*G01M 3/38* (2006.01)
*G01M 3/02* (2006.01)
*G01M 3/32* (2006.01)

(52) U.S. Cl.
CPC .............. *G01M 3/38* (2013.01); *G01M 3/02* (2013.01); *G01M 3/3272* (2013.01)

(58) Field of Classification Search
CPC ........ G01M 3/3272; G01M 3/38; G01M 3/02; G01M 3/027; G01M 3/227; G01M 3/26; G01M 3/3218; A62B 27/00
See application file for complete search history.

(56) References Cited

U.S. PATENT DOCUMENTS

| 3,688,768 A | 9/1972 | Reimschussel et al. | |
| 4,796,467 A * | 1/1989 | Burt | A62B 27/00 128/200.24 |
| 5,808,182 A * | 9/1998 | Stumpf | A62B 27/00 73/40 |

(Continued)

FOREIGN PATENT DOCUMENTS

| FR | 851907 | 9/1938 |
| FR | 1429204 | 4/1965 |

OTHER PUBLICATIONS

Machine translation of FR 1429204.
Machine translation of FR 851907.

*Primary Examiner* — David A Rogers
*Assistant Examiner* — Gedeon M Kidanu
(74) *Attorney, Agent, or Firm* — Merek, Blackmon & Voorhees, LLC

(57) ABSTRACT

An apparatus for use in testing protective masks for leaks. The apparatus includes a test head assembly for supporting at least a portion of a protective mask to be tested for leaks. The test head assembly may be freestanding, mounted directly on a mask tester or integral with the mask tester. The test head assembly includes a body and a cover. The body includes a head section simulating at least a portion of a human head. The cover is mounted on the body to cover at least a portion of the head section. The test head assembly is preferably configured such that a portion of the cover can be inflated while the remaining portion of the cover remains in a relaxed state and in contact with the corresponding portion of the body.

23 Claims, 6 Drawing Sheets

(56) References Cited

U.S. PATENT DOCUMENTS

| | | | | |
|---|---|---|---|---|
| 6,435,009 | B1* | 8/2002 | Tilley | A62B 27/00 73/40 |
| 7,140,234 | B2* | 11/2006 | Tilley | A62B 27/00 73/40 |
| 8,196,454 | B2* | 6/2012 | Hanson | A62B 27/00 128/202.22 |
| 8,196,483 | B2 | 6/2012 | Limbrick et al. | |
| 8,312,761 | B1* | 11/2012 | Montividas | G01M 3/02 128/202.22 |
| 8,708,708 | B1* | 4/2014 | Carideo | A62B 27/00 434/270 |
| 2007/0105082 | A1* | 5/2007 | Laerdal | G09B 23/288 434/265 |
| 2009/0288504 | A1* | 11/2009 | Eiwen | A62B 27/00 73/865.9 |
| 2011/0138884 | A1* | 6/2011 | Hanson | A62B 27/00 73/40 |
| 2012/0073359 | A1* | 3/2012 | Hanson | G01M 3/26 73/40 |

\* cited by examiner

TEST HEAD ASSEMBLY FOR USE IN TESTING PROTECTIVE MASKS

FIELD OF THE INVENTION

The present invention is directed to a test head assembly or device for use with a mask tester to determine whether one or more leaks are present in one or more portions of a protective mask. The test head assembly can be used in testing military and commercial type protective masks. The test head assembly of the present invention may be used with a multitude of different mask testers including but not limited to mask testers utilizing the following testing techniques: (i) challenge concentration; (ii) vacuum or pressure decay; (iii) controlled negative pressure while monitoring flow; and (iv) ultrasonic.

BACKGROUND OF THE INVENTION

Protective masks have been used for sometime in both civilian and military applications. These protective masks are designed to protect the wearer from nuclear, biological, chemical agents, fumes, aerosols, gases and airborne contaminants. Hence, it is extremely important that the mask be properly tested to ensure that it will protect the wearer from these life-threatening agents.

It is often advantageous to test a protective mask without the protective mask being worn by an individual. Therefore, previously known mask testers have employed test heads about which a protective mask is mounted for testing. The disadvantages inherent in previously known test heads can have dramatic and adverse impacts on the mask testing process as explained below.

Previously known test heads used to test protective masks have been purposely designed to replicate the form of the corresponding region of the human head and neck. For example, test heads for face seal type protective masks take on the form of a human face while test heads for neck seal type protective masks replicate the human head and neck. However, previously known test heads have been limited in that such test heads cannot accommodate a variety of different type or size of protective masks. Rather, when prior test heads will not accommodate a particular size or type of protective mask, the test head must be removed from the mask tester and replaced with a different form of test head. Thus, it is often the case that multiple test heads are required with a given mask tester to test different protective masks.

OBJECTS AND SUMMARY OF THE INVENTION

An object of the present invention is to provide a novel and unobvious test head assembly for use in testing protective masks.

Another object of a preferred embodiment of the present invention is to provide a test head assembly for use in testing protective masks that allows a protective mask to be readily and properly mounted about the test head assembly such that false leaks are substantially reduced and/or entirely eliminated.

A further object of a preferred embodiment of the present invention is to provide a test head assembly designed to accommodate a greater number of differing protective masks.

Yet another object of a preferred embodiment of the present invention is to provide a test head assembly that allows for inflation of only a portion of an outer cover of the test head while the remaining portion of the outer cover remains in an uninflated state.

Still a further object of a preferred embodiment of the present invention is to provide a test head assembly that allows for inflation of only a portion of an outer cover of the test head while the remaining portion of the outer cover remains in an uninflated state without modifying or otherwise altering the structure of the outer cover of the test head.

Still another object of a preferred embodiment of the present invention is to provide a test head assembly that includes an inner body simulating a human head where the inner body includes an insolation member or boundary member that creates first and second areas between the outer cover and the inner body where the first area is substantially sealed to allow the portion of the cover over the first area to be inflated while the portion of the cover over the second area remains uninflated and in contact with the inner body.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to an apparatus for use in testing a protective mask for leaks. The apparatus includes a test head assembly for supporting at least a portion of a protective mask to be tested for leaks. The test head assembly includes a body and a cover. The body has a head section simulating a human head. The cover is mounted on the body to cover at least a major portion of the head section. The test head assembly has a boundary member for defining a first area and a second area between the cover and the head section of the body. The first area is substantially sealed such that when a fluid is directed into the first area a portion of the cover extending over the first area will inflate while a portion of the cover extending over the second area remains in contact with the head section.

Another embodiment of the present invention is directed to an apparatus for use in testing a protective mask for leaks. The apparatus includes a test head assembly for supporting at least a portion of a protective mask to be tested for leaks. The test head assembly includes a body and a cover. The body has a head section simulating a human head. The cover is mounted on the body to cover at least a portion of the head section. The test head assembly has an isolation member for substantially isolating a first area between the cover and the head section from a second area between the cover and the head section such that when a fluid is directed into the first area a portion of the cover extending over the first area will inflate while a portion of the cover extending over the second area remains in contact with the head section.

A further embodiment of the present invention is directed to an apparatus for use in testing a protective mask for leaks. The apparatus includes a test head assembly for supporting at least a portion of a protective mask to be tested for leaks. The test head assembly includes a body and a cover. The body has a head section simulating a human head. The cover is mounted on the body to cover at least a portion of the head section. The test head assembly has a first area formed between the cover and the head section and a second area formed between the cover and the head section. The first area is substantially sealed such that when a fluid is directed into the first area a portion of the cover extending over the first area will inflate while a portion of the cover extending over the second area remains in contact with the head section. The first area is smaller than the second area.

The above summary describes preferred forms of the present invention and is not in any way to be construed as limiting the claimed invention to the preferred forms.

DETAILED DESCRIPTION OF THE PREFERRED EMBODIMENTS OF THE INVENTION

The preferred forms of the test head assembly will now be described with reference to FIGS. 1-6. The appended claims are not limited to the preferred forms and no term and/or phrase used herein is to be given a meaning other than its ordinary meaning unless it is expressly stated otherwise.

FIGS. 1 Through 5

Figure 1:
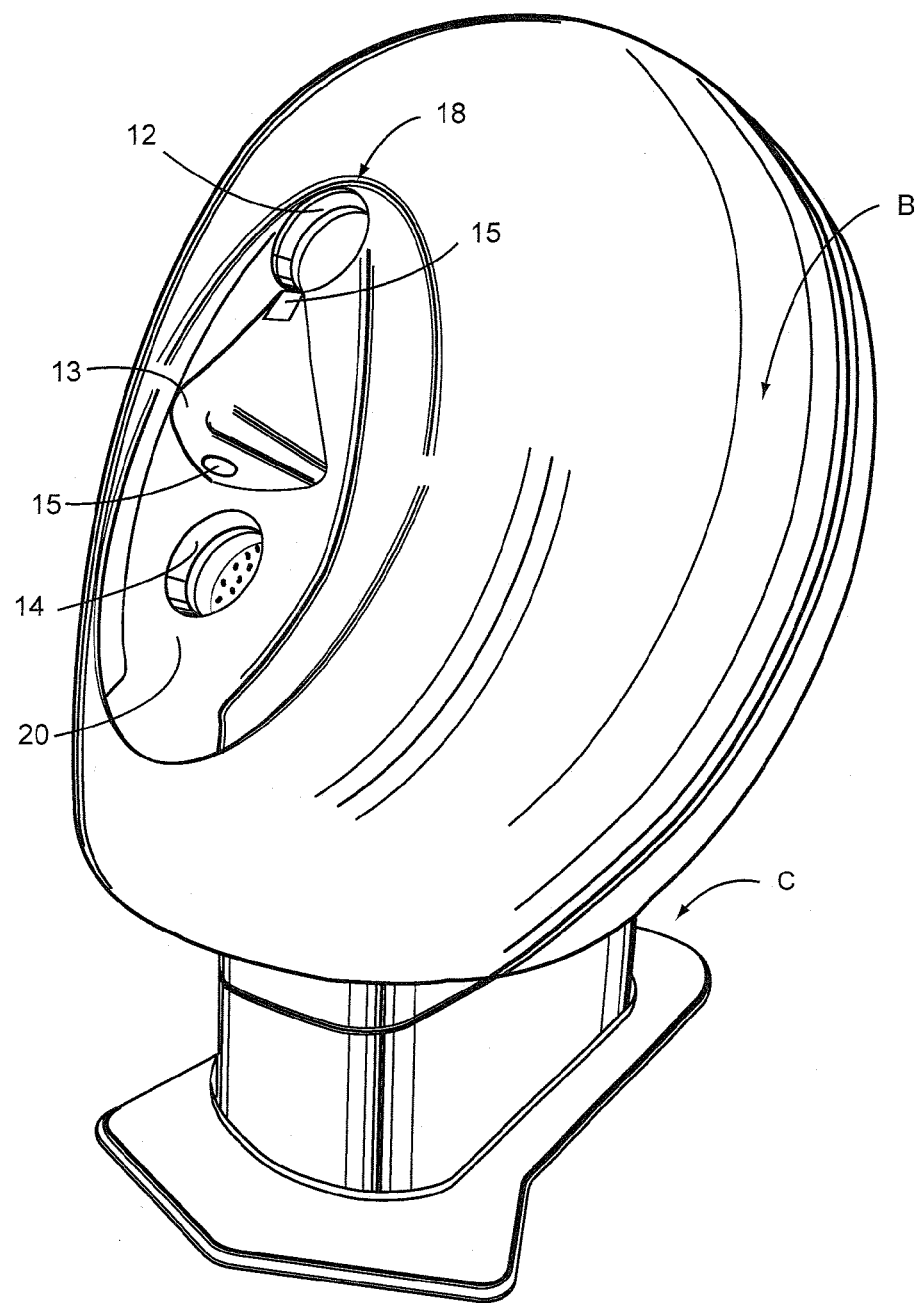
FIG. 1 is a perspective view a test head assembly formed in accordance with a preferred embodiment of the present invention.
Figure 2:
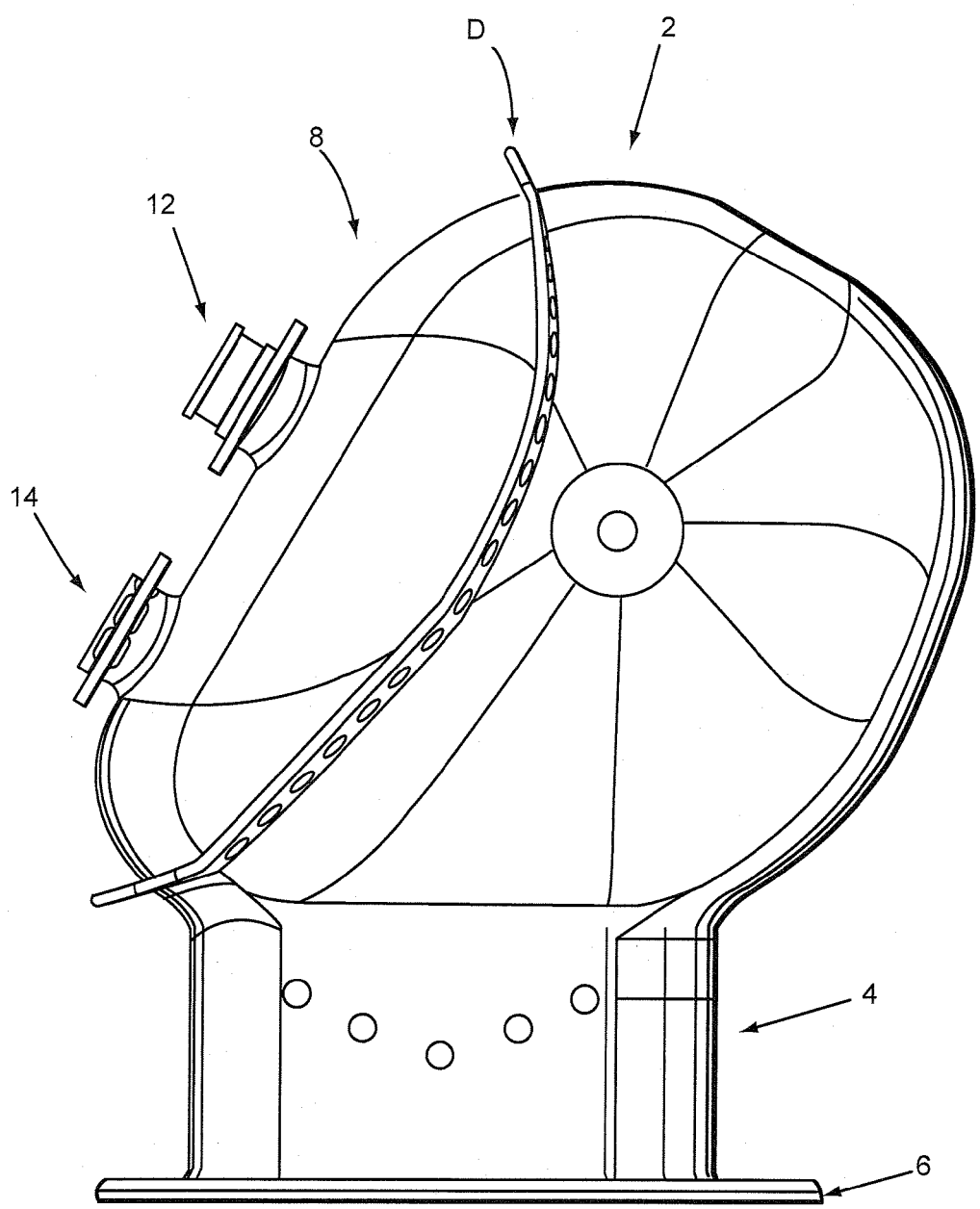
FIG. 2 is an elevation view of one preferred form of the body of the test head assembly formed in accordance with the embodiment illustrated in FIG. 1.

Referring to FIGS. 1 and 2, a preferred form of test head assembly A is illustrated. Test head assembly A is configured to be mounted directly on a mask tester. However, it should be noted that the present invention is not limited to a test head assembly that is directly mounted on a mask tester. On the contrary, the test head assembly could be a freestanding test head assembly. It should be further noted that the test head assembly of the present invention can be used with a multitude of different mask testers. By way of example only and not limitation, the test head assembly A may be used with the mask tester disclosed in U.S. Pat. No. 6,435,009. It should be further noted that the test head assembly A may be used with mask testers employing varying testing techniques including but not limited to: (i) detection of challenge concentration by a photometer, CNC device or other particle detection device; (ii) detection of pressure or vacuum decay; (iii) monitoring of fluid flow under controlled negative pressure; and (iv) ultrasonic testing techniques.

Referring to FIG. 1, the preferred form of the test head assembly A includes a cover B mounted on test head body C. Preferably, cover B is formed of an elastomeric material. In the most preferred embodiment, cover B is formed through molding as a single piece. Test head body C can be formed of any suitable material.

Referring to FIGS. 2 through 5, one preferred form of the test head body C will now be described. Test head body C includes a head portion 2, a neck portion 4, and a mounting plate 6. While mounting plate 6 is shown as being substantially flat, it may take any form that mimics the surface of the mask tester on which the test head assembly A is mounted. Preferably, the head portion 2 is configured to simulate a human head. While head portion 2 simulates the entire human head, the head portion could simulate only a portion (e.g., face portion) of the human head. The test head body C includes an isolation or boundary member D. In the most preferred embodiment, the isolation or boundary member surrounds the face portion 8 of the test head body C.

Member D in this embodiment is a raised, endless fence-like member having a plurality of uniformly spaced openings 10 formed therein. The size, number and spacing of the openings 10 may be readily varied as desired. Face portion 8 of test head body C further includes ports 12 and 14 and opening 16 formed between the ports 12 and 14. Referring to FIG. 1, cover B includes openings 18 and 20 to receive ports 12 and 14 and provide a seal around ports 12 and 14, respectively of test head body C. Nose piece 13 of cover B includes a fluid passageway 15 which extends from the lower portion of the nose piece 13 to the upper portion of the nose piece 13 to prevent ports 12 and 14 from being obstructed by some protective masks. The fluid passageway 15 does not extend from the inner surface of the cover B to the outer surface of the cover B. Therefore, a seal is maintained between the cover and test head body C despite the presence of fluid passageway 15.

Figure 3:
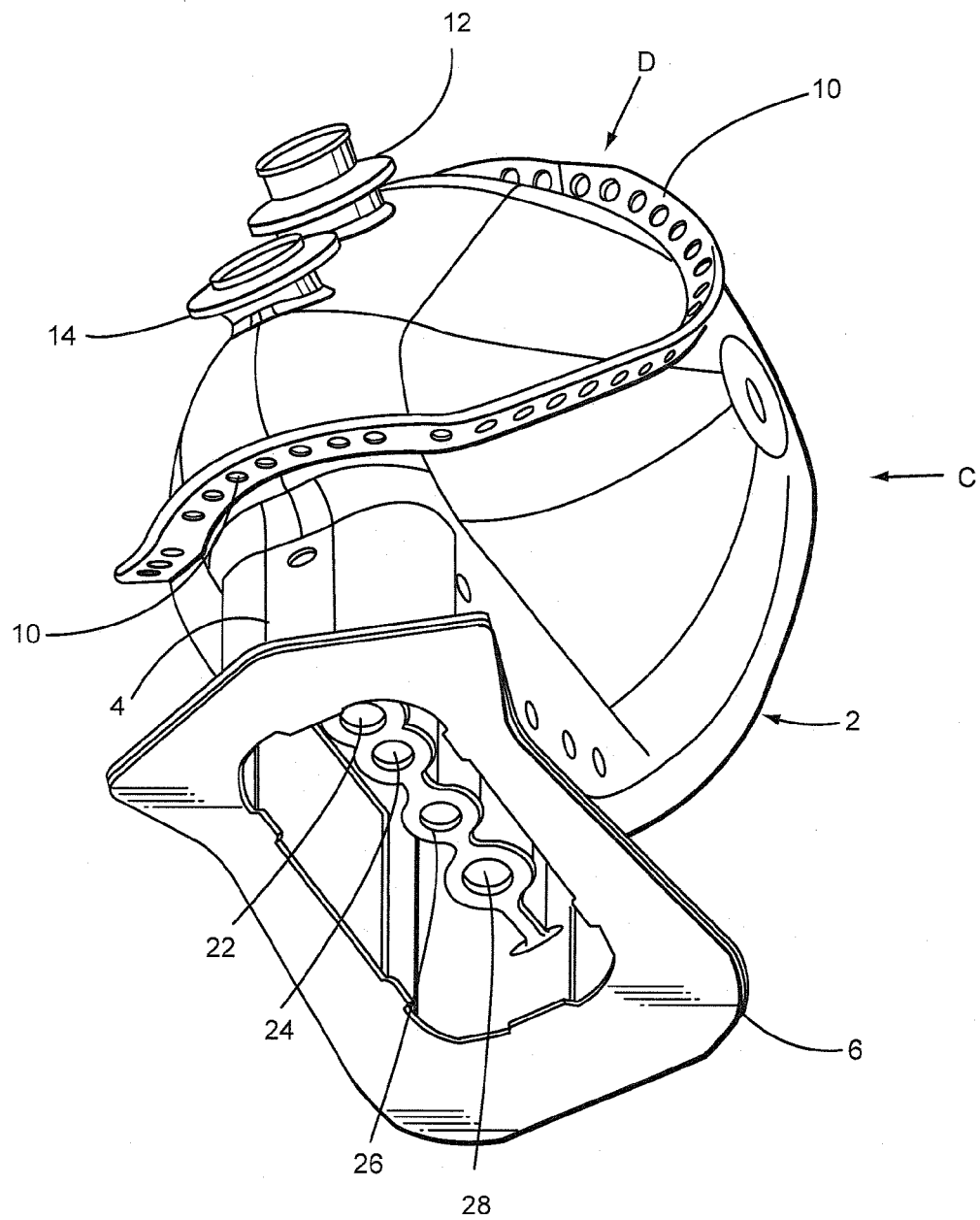
FIG. 3 is a bottom perspective view of the body of the test head assembly illustrated in FIG. 2.
Figure 4:
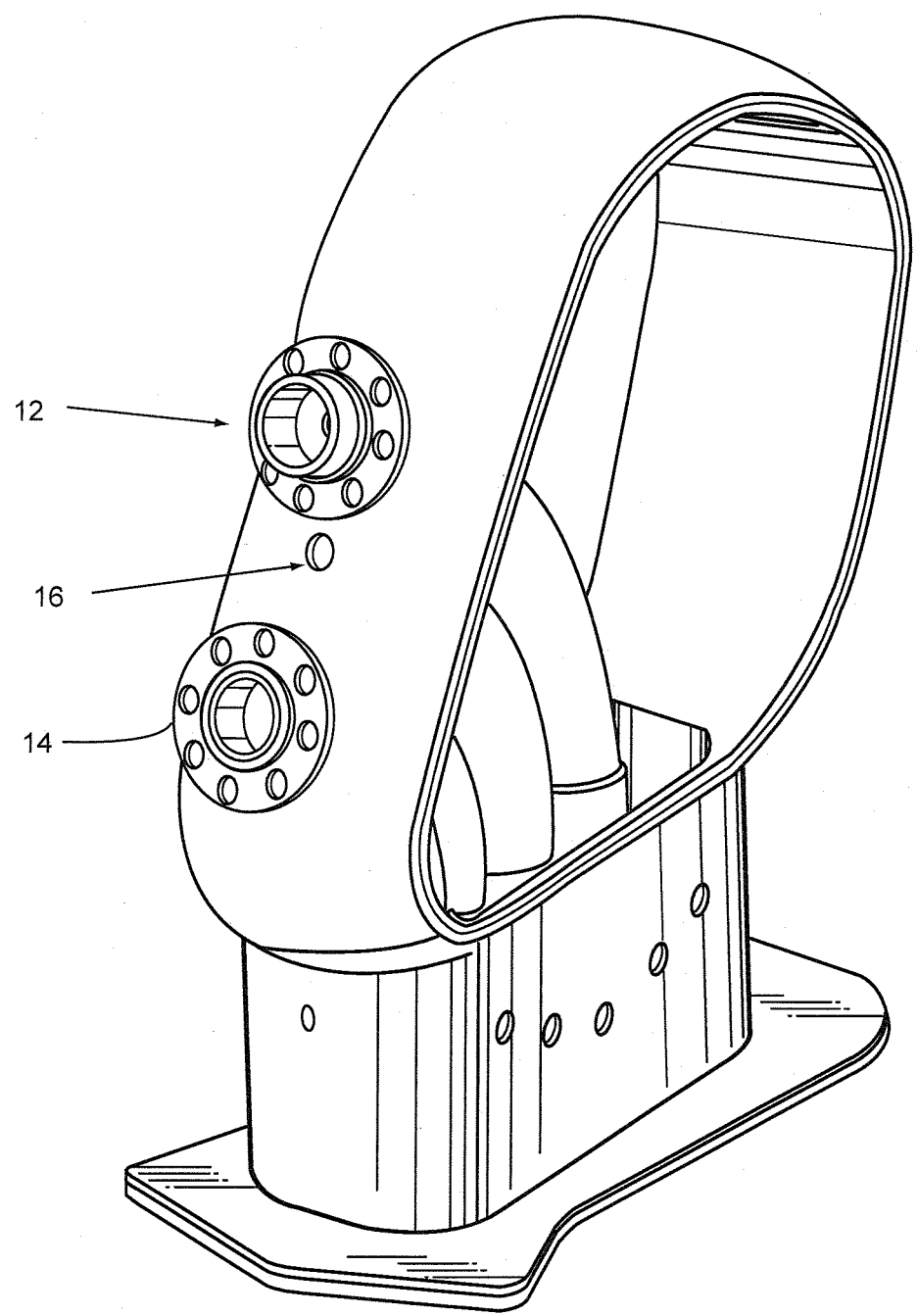
FIG. 4 is a fragmentary front perspective view of the body of the test head assembly illustrated in FIG. 2 with portions thereof removed so that inner components of the body are visible.
Figure 5:
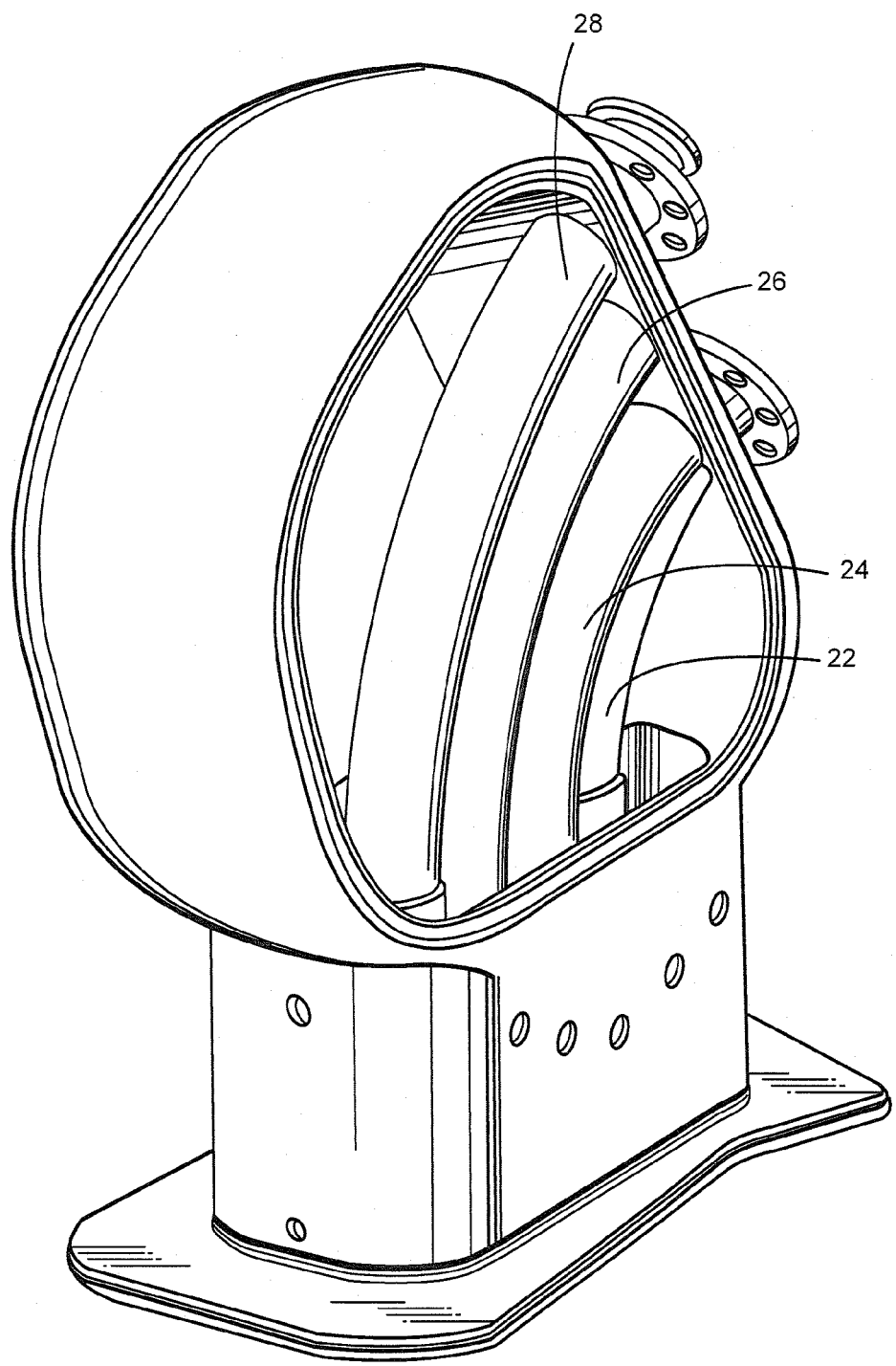
FIG. 5 is a fragmentary rear perspective view of the body of the test head assembly illustrated in FIG. 2 with portions of the body removed so that inner components of the body are visible.

Referring to FIGS. 3 to 5, test head body C includes conduits 22, 24, 26 and 28. Conduit 22 is connected at one end to port 14 and at the other end to a vacuum port of the mask tester. Conduit 24 is connected at one end to port 14 and at the other end to a sensor port of the mask tester. Conduit 26 is connected at one end to opening 16 and the other end to a pressurized fluid supply port of the mask tester. Conduit 28 is connected at one end to port 12 and at the other end to a filtered air supply port of the mask tester.

During testing of a protective mask, a vacuum pulls filtered air through conduit 28 into conduits 22 and 24. Hence, air flow similar to that shown in FIG. 5B of U.S. Pat. No. 6,435,009 occurs in the space between the protective mask mounted on the test head assembly A and the cover B. Where the mask tester uses an aerosol challenge as the testing agent and the protective mask being tested has a leak, the aerosol challenge will be pulled through conduit 22 and analyzed by a photometer to detect the leak in the protective mask. However, it must be appreciated that the present invention is not limited to mask testers employing an aerosol challenge and/or a photometer. A pressure transducer or other sensor is connected to the sensor port of the mask tester so that the force of the vacuum can be readily monitored to permit an operator to confirm that predetermined testing conditions are satisfied.

Member D creates a sealed or substantially sealed chamber between the cover B and the test head body C in the area surrounded by member D. Specifically, portions of cover B extend into the openings 10 in member D to seal off the area between cover B and test head assembly C adjacent face portion 8 from the remaining area formed between cover B and test head assembly C. During or prior to testing, a fluid may be supplied through opening 16 into the area between the cover B and the test head body C surrounded by member D. This supply of fluid, preferably air, through opening 16 will cause the portion of cover B extending over face portion 8 to inflate while the remaining portion of the cover remains in an uninflated state and in contact with the corresponding area of test head body C. This feature allows one to vary the configuration of the test head assembly in the face area to allow the test head assembly to accommodate a greater variety of protective masks. This feature also improves the seal between the test head assembly A and the protective mask mounted thereon to eliminate or substantially reduce the mask tester detecting false leaks.

It should be noted that while the above embodiment includes one endless fence-like member D to form a single large fluid receiving chamber that receives a fluid to inflate the corresponding portion of the cover, a plurality of endless fence-like members could be used to form a plurality of smaller fluid receiving chambers for inflating corresponding portions of the cover. It is also to be noted that the position of the endless fence-like member D on test head body C can be varied as desired. Further, as opposed to an endless fence-like member D, a plurality of raised and spaced sections could be positioned at desired locations on the test head body C. For example, member D could take the form as shown in FIGS. 2 to 5 but with portions of the fence-like member removed so that member D is no longer endless but rather formed by a plurality of sections with gaps between adjacent sections.

FIG. 6

Figure 6:
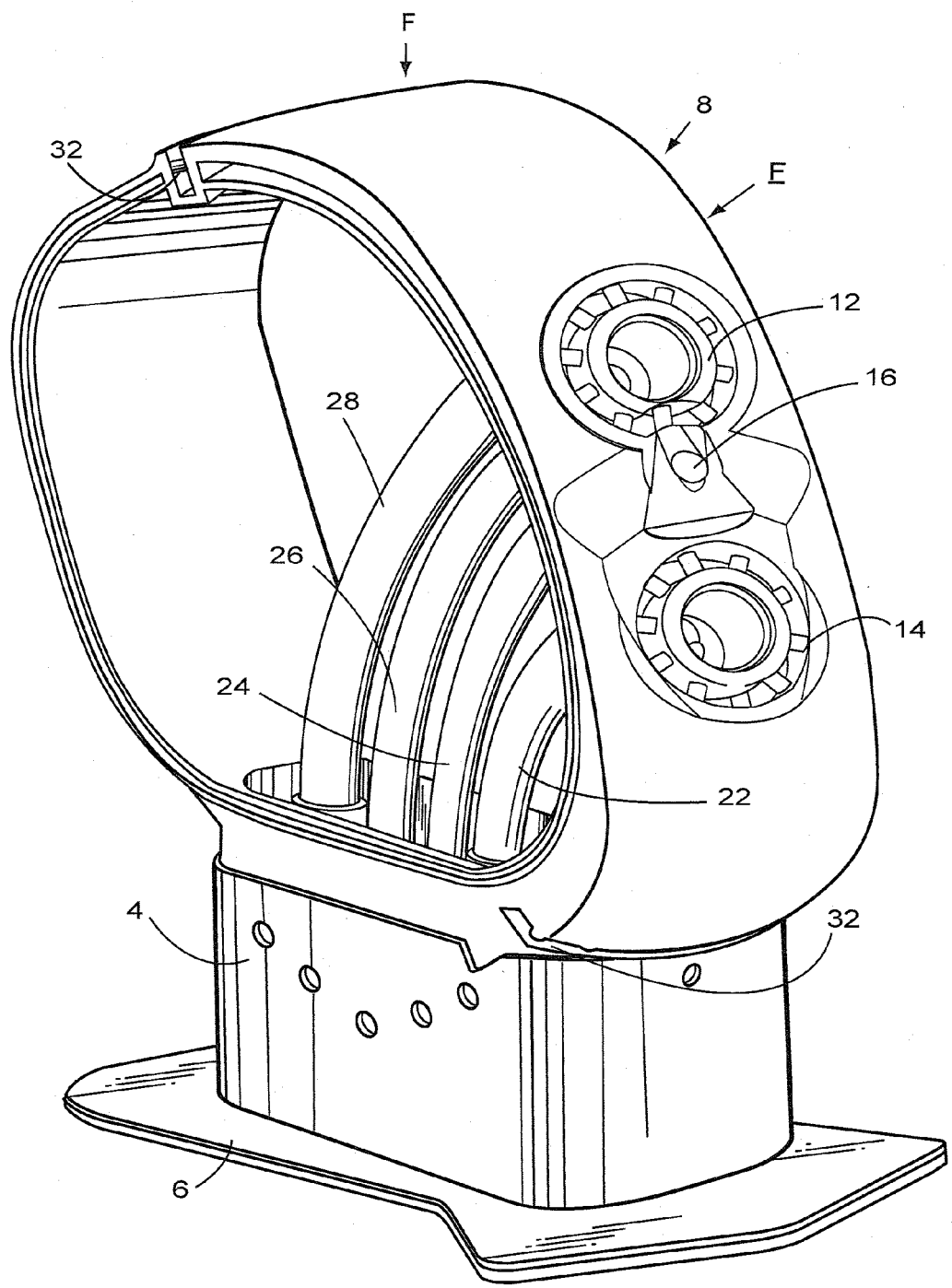
FIG. 6 is a fragmentary side perspective view of a body of a test head assembly formed in accordance with another preferred form of the present invention with portions of the body removed so that inner components of the body are visible.

Another preferred form of test head body is illustrated in FIG. 6. Test head body E is similar to test head body C and, therefore only the differences will be described in detail. It is noted that cover B may be used with test head body E. Where features of test head body E in FIG. 6 have the same reference numerals as test head body C, such features have the attributes and functions as described in connection with test head body C.

Test head body E includes an isolation or boundary member F having an endless groove 30 and a plurality of pins or rods 32 disposed in the endless groove. Pins or rods 32 extend from one side of the endless groove to the opposing side of the endless groove. The pins or rods 32 may be uniformly spaced in the endless groove 30. Portions of the cover B extend into endless groove 30 and become lodged between adjacent pins or rods 32 to form a sealed or substantially sealed chamber in the area adjacent the face portion 8 of the test head body E. Hence, when a fluid, preferably air, is directed through opening 16, the portion of the cover extending over the face portion 8 will inflate while the remaining portion of the cover will remain uninflated and in contact with the test head body E.

While groove 30 is shown as an endless groove, it will be appreciated that a plurality of space grooves may be formed in various areas of the test head assembly to form one or more sealed or substantially sealed chambers. It should be further noted that retaining pins or rods 32 may be omitted entirely or replaced with other retaining members including but not limited to recesses or openings formed in one or more interior walls of groove 30.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiments and have been written to preclude such a narrow construction using the principles of claim differentiation.

We claim:

1. An apparatus for use in testing a protective mask for leaks, said apparatus comprising:
   (a) a test head assembly for supporting at least a portion of a protective mask to be tested for leaks;
   (b) said test head assembly including a body and a cover, said body having a head section simulating at least a portion of a human head, said cover being mounted on said body to cover at least a first portion of said head section, said first portion of said head section including an area of said head section which corresponds to a location of a human nose; and,
   (c) said test head assembly having a boundary member for defining a first area and a second area between said cover and said head section of said body, said first area being substantially sealed such that when a fluid is directed into said first area a portion of said cover extending over said first area will inflate while a portion of said cover extending over said second area remains in contact with said head section, said second area being positioned directly adjacent a first inner surface of said cover, said first inner surface of said cover being in direct contact with said boundary member.

2. The apparatus set forth in claim 1, wherein:
   (a) said boundary member includes at least one groove formed in said head section of said body, said cover extends into said at least one groove to substantially seal said first area.

3. The apparatus as set forth in claim 1, wherein:
   (a) wherein the boundary member includes a first section having a plurality of retaining members, said plurality of retaining members of the boundary member are disposed outwardly of an outermost surface of at least a portion of said head section.

4. The apparatus as set forth in claim 1, wherein:
   (a) said boundary member includes a raised member having a plurality of openings.

5. The apparatus as set forth in claim 4, wherein:
   (a) said raised member surrounds a face portion of said head section of said body and a portion of said cover extends into at least one of said plurality of openings.

6. The apparatus as set forth in claim 1, wherein:
   (a) said boundary member includes a first endless groove that surrounds a face portion of said head section, said cover extends into said first endless groove to substantially seal said first area.

7. The apparatus as set forth in claim 6, wherein:
   (a) an outermost surface of said face portion of said head section includes a first opening, said first opening is operably associated with a supply conduit supplying fluid to the first area through said first opening and said first opening is disposed inwardly of said first endless groove.

8. The apparatus as set forth in claim 7, wherein:
   (a) said cover is a single piece formed from an elastomeric material.

9. The apparatus as set forth in claim 7, wherein:
   (a) said boundary member includes a plurality of retaining members disposed in said first groove, said first endless groove includes a first side and a second side, each of said plurality of retaining members extend from said first side to said second side of said first endless groove.

10. The apparatus as set forth in claim 9, wherein:
    (a) said plurality of retaining members are uniformly spaced in said first endless groove.

11. The apparatus as set forth in claim 9, wherein:
    (a) said plurality of retaining members include a first pin and a second pin, said first pin being spaced from said second pin, at least a portion of said cover extends downwardly into the first endless groove between said first pin and said second pin.

12. An apparatus for use in testing a protective mask for leaks, said apparatus comprising:
    (a) a test head assembly for supporting at least a portion of a protective mask to be tested for leaks;
    (b) said test head assembly including a body and a cover, said body having a head section simulating at least a portion of a human head, said cover being mounted on said body to cover at least a first portion of said head section, said first portion including an area corresponding to a location of a human nose; and,
    (c) said test head assembly having an isolation member for substantially isolating a first area between said cover and said head section from a second area between said cover and said head section such that when a fluid is directed into said first area a portion of the cover extending over the first area will inflate while a portion of the cover extending over the second area remains in contact with said head section, and wherein at least a portion of said cover is disposed directly above and covers said isolation member.

13. The apparatus as set forth in claim 12, wherein:
    (a) said head section includes a first opening and a first fluid supply conduit for supplying a fluid to said first area through said first opening.

14. The apparatus as set forth in claim 13, wherein:
    (a) said head section includes a second opening and a third opening, and a vacuum conduit operably connected to said third opening, said vacuum conduit being configured to be connected to a vacuum source to pull fluid passing through said second opening into said third opening.

15. The apparatus as set forth in claim 14, wherein:
    (a) said isolation member surrounds a face portion of said head section and a portion of said cover extends into said isolation member.

16. The apparatus as set forth in claim 15, wherein:
    (a) said isolation member is a raised member having a plurality of openings and at least a portion of said cover extends into at least one of said plurality of openings.

17. The apparatus as set forth in claim 15, wherein:
    (a) said isolation member includes an endless groove formed in said head section.

18. The apparatus as set forth in claim 17, wherein:
    (a) said isolation member further includes a plurality of pins disposed in said endless groove, said endless groove including a first side and a second side, each of said plurality of pins extend from said first side to said second side of said endless groove.

19. An apparatus for use in testing a protective mask for leaks, said apparatus comprising:
    (a) a test head assembly for supporting at least a portion of a protective mask to be tested for leaks;
    (b) said test head assembly including a body and a cover, said body having a head section simulating a human head, said cover being mounted on said body to cover at least a portion of said head section; and,
    (c) said test head assembly having a first area formed between said cover and said head section and a second area formed between said cover and said head section, said first area being substantially sealed such that when a fluid is directed into said first area a portion of the cover extending over the first area will inflate while a portion of the cover extending over the second area remains in contact with said head section, said first area being smaller than said second area.

20. The apparatus as set forth in claim 19, wherein:
    (a) said first area is disposed adjacent a face portion of a protective mask to be tested.

21. The apparatus as set forth in claim 20, wherein:
    (a) said head section includes a recess, at least a portion of said cover extends into said recess to substantially seal said first area.

22. An apparatus for use in testing a protective mask for leaks, said apparatus comprising:
    (a) a test head assembly for supporting at least a portion of a protective mask to be tested for leaks;
    (b) said test head assembly including a body and a cover, said body having a head section, said cover being mounted on said body to cover at least a portion of said head section; and,
    (c) said test head assembly having an isolation member for substantially isolating a first area between said cover and said head section such that when a fluid is directed into said first area a portion of the cover extending over the first area will inflate, said isolation member including at least one groove formed in a surface of said head section of said body and a plurality of retaining members disposed in said at least one groove, said cover extends into said at least one groove to substantially seal a perimeter of said first area and said plurality of retaining members extend from one side of said at least one groove to an opposing side of said at least one groove.

23. The apparatus as set forth in claim 22, wherein:
    (a) said at least one groove is an endless groove that surrounds at least a face portion of said head section; and,
    (b) a fluid opening for supplying fluid to said first area, said fluid opening is formed in an outer surface of said head section and is disposed inwardly of said at least one endless groove.

* * * * *